United States Patent [19] [11] 3,911,052
Castagna et al. [45] Oct. 7, 1975

[54] BLOCK COPOLYMERS OF ETHYLENE AND PROPYLENE AND PROCESS FOR THEIR MANUFACTURE

[75] Inventors: Eugene G. Castagna, Clark; Peter J. Perron, Pompton Plains, both of N.J.; Ronald I. Christensen, Odessa, Tex.

[73] Assignee: Dart Industries Inc., Los Angeles, Calif.

[22] Filed: Mar. 12, 1973

[21] Appl. No.: 340,405

[52] U.S. Cl. ............................ 260/878 B; 260/878 B
[51] Int. Cl. ................................................ C08f 15/04
[58] Field of Search ................................ 260/878 B

[56] References Cited
UNITED STATES PATENTS

| | | | |
|---|---|---|---|
| 3,442,978 | 5/1969 | Khelghatian et al. | 260/878 B |
| 3,514,501 | 5/1970 | Leibson et al. | 260/878 B |
| 3,642,951 | 2/1972 | Shirai et al. | 260/878 B |
| 3,702,352 | 11/1972 | Leibson | 260/878 B |

FOREIGN PATENTS OR APPLICATIONS

| | | | |
|---|---|---|---|
| 19,542 | 8/1969 | Japan | 260/878 B |

*Primary Examiner*—Joseph L. Schofer
*Assistant Examiner*—A. H. Holler
*Attorney, Agent, or Firm*—Fred S. Valles; Margareta LeMaire

[57] ABSTRACT

Novel compositions of block copolymers of ethylene and propylene and processes therefor which compositions exhibit improved oriented film shrink properties, improved processability and improved uniformity in gauge when extruded and oriented into films and which exhibit improved impact strenght, improved low temperature brittleness properties and improved parison stability when molded as compared to prior art processes. The compositions comprise:

a. 60% to 96% by weight of a prepolymer block of a random copolymer of (1) 90 to 99 mole percent of propylene and 1 to 10 mole percent of ethylene, and b. 4% to 40% by weight of a post block of a random copolymer of (1) 70 to 99 mole percent of propylene and 1 to 30 mole percent of ethylene.

7 Claims, No Drawings

BLOCK COPOLYMERS OF ETHYLENE AND PROPYLENE AND PROCESS FOR THEIR MANUFACTURE

This invention pertains to novel crystalline block copolymers of ethylene and propylene having transparency, contact clarity, improved oriented film shrink properties as well as other improved properties, which makes the block copolymers especially suitable for use in the packaging field.

Although polyvinyl chloride resins and modifications of such resins have a number of desirable properties, including transparency, clarity and heat shrink properties, which make them suitable for the production of oriented films and molded containers, serious additive stability and cost problems, however, at least from a competitive and food additive standpoint, have limited their use in the packaging field, especially in the packaging of foods. Recently, polypropylene block copolymers consisting of a prepolymer block of ethylene and propylene and a propylene homopolymer postblock have been developed (see U.S. Pat. No. 3,702,352) which block copolymers when molded exhibit transparency and contact clarity. However, these block copolymers when processed into oriented films are lacking in several important properties necessary in end use shrink wrap. The major problems encountered are poor sealability and poor shrinkage of the film. Also, processing problems have been encountered in extruding and orienting the films. A need has therefore arisen for a low cost thermoplastic resin possessing a combination of properties including improved end use shrink wrap characteristics.

One specific object of this invention is the provision of novel block copolymers of propylene and ethylene which, when extruded and oriented into films exhibit improved shrink properties.

Another specific object of this invention is the provision of novel block copolymers of propylene and ethylene which, when extruded into thin sheets or molded into containers and similar articles having thin sections, exhibit contact clarity, transparency and good melt strength as well as improved low temperature brittleness and impact properties. Other objectives will become apparent from a reading of this specification.

In accordance with this invention, novel compositions alpha-olefin block copolymers are herein provided which comprise a chain segment A and attached thereto a chain segment B, chain segment A consisting essentially of a random copolymer of ethylene and propylene, the ethylene derived units constituting on a molar basis from 1 to 10% of said random copolymer, said chain segment A having an average molecular weight of from 50,000 to 500,000, exhibiting a crystalline structure under the X-rays and constituting essentially from 60 to 96% by weight of the total composition of A and B segments; and, chain segment B consisting essentially of a random copolymer of ethylene and propylene, the ethylene derived units constituting on a molar basis from 1 to 30% of said random copolymer, said chain segment B having an average molecular weight of from about 20,000 to about 2,000,000, exhibiting a substantial crystalline structure under the X-rays and constituting essentially from 40 to 4% by weight of the total composition.

As used in this specification, the term "contact clarity," a feature of those resins made from block copolymers of propylene and ethylene in accordance with this invention, means that bottles or thin sections such as sheets of from 5 to 200 mils thickness, preferably 5 to 35 mils, while translucent or transparent in appearance, will upon contact with an object such as a colored liquid or a solid of any type, permit the object to be viewed clearly, that is, in the case of a colored liquid, the color comes through clearly while in the case of a solid object such as print on a piece of paper, the print comes through clearly as if the thin section were made of glass. The clarity of the resin after contact with the object is comparable to clear polyvinyl chloride (thin) sections. Furthermore, when industrial items such as bottles are deformed, no noticeable residual stress lines (blush) remain in the bottle.

This invention encompasses the preparation of block copolymers of ethylene and propylene wherein the copolymers are formed of a first polymeric chain segment A to which (it is believed) a second polymeric chain segment B is chemically united (the designations "A" and "B" segments are used herein to aid in understanding the nature of the copolymers).

The polymeric chain segment A, according to the foregoing, constitutes, in the synthesis of the copolymer, a prepolymer containing active catalytic residues onto which, by virtue of said catalytic residues, a further polymeric chain can be formed or attached. The polymeric chain segment A is composed of a major proportion of propylene derived units, that is, from 90 to 99 percent and preferably from 90 to 98.5 percent on a molar basis, and a minor proportion of ethylene derived units, that is from 10 to 1 percent and preferably from 10 to 1.5 percent on a molar basis copolymerized in random fashion so as to obtain a random copolymer chain which nevertheless exhibits crystallinity under the X-rays and has an average molecular weight, as determined by intrinsic viscosity measurements in Decalin at 135°C (as expressed in deciliters per gram - dl/g), of from 50,000 to 500,000 (intrinsic viscosity from about 0.76 to 3.30 dl/g). The polymeric chain segment A also constitutes a major proportion of the synthesized block copolymer composition, ranging from 60 to 96 percent and preferably from 84 to 96 percent by weight of the total.

The polymeric chain segment A exhibits crystallinity under the X-rays and this property is essential for maintaining stiffness and tensile values at a maximum and aiding favorably impact and low temperature brittleness properties. The percent crystallinity as measured by X-rays of the chain segment A will be substantial and will depend on the particular amount of ethylene comonomer used, that is, 2 percent versus 10 percent but, of course, will not be as high in comparison to a propylene homopolymer.

The polymeric chain segment B is formed by copolymerizing ethylene and propylene onto the polymeric chain segment A (prepolymer) containing active catalyst residues and is composed of a major proportion of propylene derived units, ie. from 70 to 99 percent and preferably from 85 to 98.5 percent on a molar basis and a minor proportion of ethylene derived units, ie. from 30 to 1 percent and preferably from 15 to 1.5 percent on a molar basis. Chain segment B is also crystalline under the X-rays and has an average molecular weight, as determined by intrinsic viscosity measurements in Decalin at 135°C of from 20,000 to 2,000,000 (intrinsic viscosity about 0.42 to 8.1 dl/g). Chain segment B in the block copolymer compositions of this invention constitutes from 4 to 40 percent and preferably from 4 to 16 percent by weight of the total composition.

As stated above, chain segment B is crystalline and this property is also essential for maintaining stiffness and tensile values and particularly toughness and impact strength.

In the preparation of the foregoing block copolymer compositions hydrogen is employed to control molecular weight of polymer chain segment A in order to maintain an average molecular weight of this prepolymer within the range of 50,000 to 500,000. The postpolymer chain segment B is prepared in the absence of hydrogen.

Where hydrogen is used to terminate the growth of a polymeric chain of a growing alpha-olefin polymer, a certain amount of such terminated polymeric chains are believed to be present in the final composition as random copolymer or homopolymer chains, that is, they do not form block copolymers and as a consequence, the ultimate composition is believed to be a mixture of block copolymers according to this invention with minor amounts of homo and random copolymers of the monomers employed. The compositions of this invention, nevertheless, possess the unique feature of non-blushing when creased or when a stress is applied to a particular area such as by folding of a sheet.

The block copolymers of this invention are prepared by a sequential polymerization process wherein a preformed random copolymer preblock is formed by polymerizing ethylene and propylene in a hydrocarbon diluent or in bulk to form a slurry, said polymerization being carried out in the presence of catalytic quantities of a catalyst formed by admixing a subhalide of a metal selected from the group of metals of Groups IVa, Va and VIa of the Periodic Table according to Mendeleef and an aluminum compound containing at least one carbon to metal bond and after such polymerization to the desired molecular weight, the preformed copolymer slurry is introduced to low pressure zone wherein volatile hydrocarbon constituents are flashed from the copolymer to thereby obtain a substantially dry preformed copolymer followed by introducing this preformed copolymer which still contains active catalyst residues into a continuously agitated reaction zone maintained at pressures of from 0 to 100 psig and temperatures of from 60° to 195°F and introducing ethylene and propylene into said continuously agitated reaction zone and polymerizing said monomers onto the preformed random copolymer to an extent of from 4 to 40% by weight based on the total weight of the polymer.

Briefly, the preferred polymerization process includes the steps of forming a random copolymer in a suitable reaction zone, employing a hydrocarbon diluent or employing a bulk reaction where at least one of the monomers is in liquid form and a catalyst for the polymerization, as defined heretofore, carrying out the polymerization to a solids content of from 5 to 60%, but preferably 20 to 50% to form a prepolymer which can be treated according to the subsequent steps. The copolymer (prepolymer) from the reaction zone, is next taken to a low pressure zone, such as a cyclone, but preferably a bag-filter cyclone combination wherein the volatile constituents are flashed from the polymer and taken through the filter, processed according to known techniques and recycled to the reaction zone, the amount of volatiles removed being sufficient so that no more than 5% volatile content remains in the prepolymer. In the method of carrying out the block polymerization reaction, herein referred to as a vapor phase block polymerization, the prepolymer from the cyclone is taken to one but preferably two or more, serially arranged, continuously agitated reaction zones containing provisions therein for introducing the monomers at one or more points along the length of said zones (and inert gases such as nitrogen) so that the active catalyst residues in the prepolymer polymerize said monomers to a block thereby modifying the ultimate properties of the resin produced. The polymerization in the continuously agitated reaction zones is carried out at pressures generally lower than those used for the prepolymer preparation. The block polymer formed in the continuously agitated reaction zones in continuous operation is then taken to suitable deashing facilities for inactivation, solubilization and removal of catalyst residues.

Propylene in the preferred method of this invention is introduced into the reactor in liquid form along with ethylene and catalyst components titanium trichloride and diethylaluminum monochloride. Polymerization is accomplished in the reactor at pressures of about 150 to 750 psig to a solids content of from 20 to 50 percent. The polymer forms as particules in the diluent (propylene and/or propane or butane) and is withdrawn from the reactor as a slurry continuously or substantially continuously.

Block copolymerization is next accomplished according to the preferred embodiment by introducing ethylene and propylene to a vapor phase reactor and after the addition of the desired amount of block copolymer to the random propylene-ethylene prepolymer, the total polymer is removed to a suitable deashing surge vessel.

Although catalytic materials which have heretofore been indicated as useful include a metal subhalide from the groups IVa, Va and VIa of the Periodic Table according to Mendeleef, for example, titanium trichloride and the subhalides of vanadium, zirconium, thorium, etc., the preferred group IVa metal is titanium trichloride and more specifically titanium trichloride cocrystallized with aluminum chloride according to the formula $nTiCl_3 \cdot AlCl_3$ where n is a number of from 1 to 5. As activators for the titanium trichloride, the aluminum compounds containing at least one carbon to metal bond are preferred. Exemplary of such compounds are trialkyl aluminums wherein the alkyl groups contain from 1 to 10 carbon atoms, but preferably aluminum triethyl or dialkyl aluminum monohalides wherein the alkyl groups contain from 1 to 10 carbon atoms and the halide is chlorine.

Temperatures at which the prepolymer formation can be carried out are those known in the art, for example, from 50° to 250°F, but preferably from 70° to 180°F. The reactor pressures in the prepolymer formation can range from atmospheric or below where normally liquid inert hydrocarbon diluents are used (heptane or hexane) to pressures up to 1,000 psig or higher where the monomer(s) is used as its own dispersing agent or the monomer in admixture with a normally gaseous hydrocarbon diluent such as propane or butane, which are liquid under the conditions of the reaction.

In the block copolymerization reaction, polymerization temperatures can be the same as in the prepolymer formation, for example, from room temperature to 195°F, but preferably from 130° to 175°F. Since the reaction is carried out in vapor phase, the pressures are lower than those used in preforming the polymer, that is, pressures of 10 to 50 psig or somewhat higher. Deashing of the finished composition can be accomplished with alcohols or mixtures of alcohols and hydrocarbons such as heptane and an aliphatic alochol of 1 to 4 carbon atoms at suitable temperatures as is well known in the art.

The method of preparation of the novel block copolymers is an essential feature of this invention. For instance, compositions prepared according to said method and containing the same proportion of ethylene derived units in both the preblock and postblock have much improved heat shrink properties as compared to a random copolymer of the same ethylene content, in fact, the random copolymer is totally unsuitable for shrink wrap end use. The incorporation of ethylene into the postblock greatly improves the shrink characteristics of film prepared therefrom compared to block copolymer compositions consisting of a preblock at random copolymer of ethylene and propylene and a postblock of propylene homopolymer. Furthermore the processability (e.g., extrusion and orientation) is improved and a more uniform product, (film thickness) is obtained.

The block copolymers of this invention are also excellent bottle grade resins, having all the desirable properties such as clarity, transparency, toughness and low temperature brittleness properties associated with prior art ethylene-propylene block copolymer bottle grade resins, in fact, even higher notched Izod impact values and improved low temperature brittleness properties are obtained with the block copolymers of this invention. Indications also point to improved parison stability in blow molding operations.

The following specific examples illustrate the preparation of the novel compositions of this invention.

Properties of the block copolymers of the examples were determined using standard analytical techniques except in the case of determinations of heat shrink properties (% free shrink), for which the following method was used. A small sample of oriented film prepared from the copolymer is immersed in mineral oil for 10 seconds. The film is allowed to shrink freely and the percentage change is based on the average reduction in dimensions for the length and width of the sample (related to the biaxial stretching in forming films).

CONTROL EXAMPLE 1

A block copolymer containing 86 wt % of a preblock of a random copolymer of ethylene and propylene (3.6 mole % ethylene, 96.4 mole % propylene) and a 14 wt % of a polypropylene postblock was prepared by polymerizing a mixture of ethylene and propylene (4.0 mole % ethylene) under liquid phase conditions at about 140°F and a total pressure of about 390 psig in the presence of 0.2 mole % hydrogen and TiCl$_3$ catalyst compounded with diethyl aluminum chloride having an Al/Ti weight ratio of 1.8. The reaction was carried out for about 1.5 hours at a typical solids content of the slurry of about 42%. The prepolymer was then separated from the slurry in a bag filter and transferred to two serially arranged continuously agitated ribbon blender reactors maintained at a total pressure of 30 psig and temperatures ranging between 160°F and 180°F. Propylene monomer was continuously introduced to each of these reactors, at a propylene partial pressure of 26 psig. The amount of postblock added in these reactors were determined by a combined heat and material balance. The resulting block copolymer was recovered and deashed employing standard techniques of treatment with a heptane-isopropyl alcohol solvent. Analyses of representatives samples from a number of runs to determine the suitability of the block copolymer for shrink wrap end use were as follows: Melt flow (ASTM D-1238): 3.5; Average Free Shrink at 260°F: 25%; Sealability: poor to fair; Processability: poor to fair; Film thickness uniformity: poor to fair.

EXAMPLE 2

A block copolymer according to this invention having the same melt flow and the same proportions of preblock and postblock and also the same ethylene content in the preblock as those of Control Example 1, but containing about 3.6 mole % of ethylene derived units in the postblock was prepared essentially according to the method of Example 1 with the exception that ethylene was introduced into the block copolymer reactors to maintain the ethylene content in the reactors at a 2 mole % level. Analyses of representative samples from the composition thus prepared showed when compared to those of the Control Example 1 that the processability, sealability and film thickness uniformity had all improved to a good to excellent rating, and the percent free shrink had almost doubled to an average of 45%.

CONTROL EXAMPLE 3

A bottle grade resin of 2 melt flow rate and having the same composition as that of Control Example 1 was prepared in accordance with the method of said Example, except the amount of hydrogen in the preblock reactor was 0.1–0.15 mole % instead of 0.2 mole %. Analyses of representative samples of many runs showed the following properties: Contact Clarity: excellent; Transparency: excellent; Notched Izod Impact at room temperature (ASTM D-256): 1.3; Unnotched Izod Impact at 0°F (ASTM D-256): 5.4; Low Temperature Brittleness Temperature at 50% fail, (ASTM D-746): +2.4°C.

EXAMPLE 4

Bottle grade resins of 2 melt flow having the same composition as that of Example 2 were prepared in accordance with the technique of Example 2 except that the hydrogen concentration in the first reactor was changed to 0.1–0.15 mole %. Analyses of representative samples showed that the notched Izod impact values had inproved to above 2; the low temperature brittleness temperatures were reduced to about 0°C while the contact clarity and transparency were the same as those of Control Example 3.

EXAMPLE 5

Another bottle grade resin was prepared as in Example 4 except that a higher percent ethylene content was incorporated into the postblock, i.e., 12.8 mole percent rather than 3.6 mole percent. The unnotched Izod impact value at 0°F increased to 9.4 and the low temperature brittleness temperature to −1°C.

What is claimed is:

1. A process for preparing an ethylene-propylene block composition comprising:

1. copolymerizing ethylene and propylene in the presence of hydrogen and a catalytic amount of a catalyst formed by admixing a subhalide of a metal selected from the metals of Groups IVa, Va and VIa of the Periodic Table according to Mendeleef and aluminum compound containing at least one carbon to metal bond and in a slurry to a solids content of 5 to 60% by weight to form a random copolymer preblock comprising 1 to 10% on a molar basis of ethylene derived units and which has an average molecular weight of from 50,000 to 500,000 and exhibits a crystalline structure under X-rays;
2. removing any volatiles present with said preblock to a level of no more than 5% by weight;
3. transferring said preblock while it still contains active catalyst to a continuously agitated reaction zone;
4. introducing ethylene and propylene to said reaction zone; and
5. block polymerizing said ethylene and propylene of step (4) onto said preblock in the vapor phase to form a random copolymer postblock comprising 1 to 30% on a molar basis of ethylene derived units, said post block having an average molecular weight of from 20,000 to 2,000,000 and exhibiting crystalline structure under X-rays and constituting 4 to 40% by weight of the total ethylene-propylene block copolymer composition.

2. A process according to claim 1 wherein said postblock constitutes 4 to 16% by weight of the total block copolymer composition.

3. A process according to claim 1 wherein the subhalide of a selected metal is titanium trichloride or titanium trichloride cocrystallized with aluminum chloride according to the formula $nTiCl_3 \cdot AlCl_3$ wherein $n$ is an number of 1 to 5.

4. A process according to claim 1 wherein the aluminum compound is a trialkyl aluminum wherein the alkyl groups have 1 to 10 carbon atoms or a dialkyl aluminum monochloride wherein the alkyl groups have 1 to 10 carbon atoms.

5. An ethylene-propylene block copolymer composition comprising:
 1. 60 to 96% by weight of a pre-segment consisting of a random copolymer of 90 to 99 mole percent of propylene derived units and 1 to 10 mole percent of ethylene derived units, said presegment being formed in a slurry in the presence of hydrogen in a first reaction zone and having an average molecular weight of from 50,000 to 500,000 and exhibiting a crystalline structure under X-rays; and
 2. 4% to 40% by weight of a post-segment consisting of a random copolymer of 70 to 99 mole percent of propylene derived units and from 1 to 30 mole percent of ethylene derived units, said post segment being formed in the absence of hydrogen in a vapor phase reaction zone subsequent to said first reaction zone and having an average molecular weight of from 20,000 to 2,000,000 and exhibiting a crystalline structure under X-rays.

6. An ethylene-propylene block copolymer composition according to claim 5 wherein the post-segment constitutes 4 to 16% by weight of the total composition.

7. An ethylene-propylene block copolymer composition comprising:
 1. 84% to 96% by weight of a pre-segment consisting of a random copolymer of 90 to 98.5 mole percent of propylene derived units and 1.5 to 10 mole percent of ethylene derived units, said presegment being formed in the presence of hydrogen in a slurry in a first reaction zone and having an average molecular weight of from 50,000 to 500,000 and exhibiting a crystalline structure under X-rays; and
 2. 4% to 16% by weight of a postsegment consisting of a random copolymer of 85 to 98.5 mole percent of propylene derived units and from 1.5 to 15 mole percent of ethylene derived units, said post segment being formed in the absence of hydrogen in a vapor phase reaction zone subsequent to said first reaction zone and having an average molecular weight of from 20,000 to 2,000,000 and exhibiting a crystalline structure under X-rays.

* * * * *